Patented Nov. 24, 1942

2,303,307

UNITED STATES PATENT OFFICE 2,303,307

PROCESS OF PREPARING TITANIUM DIOXIDE

Peter Tillmann, Cologne-Deutz, and Friedrich Raspe, Leverkusen-I. G. Werk, Germany, assignors to Titan Company, Inc., Wilmington, Del., a corporation of Delaware No Drawing. Application November 14, 1939, Serial No. 304,323. In Germany November 17, 1938

5 Claims. (Cl. 23—202)

The present invention relates to a process of preparing titanium dioxide, especially $TiO_2$ pigments possessing very high tinting strength; it has special reference to the preparation of rutile titanium dioxide pigments. By "rutile titanium dioxide" is meant titanium dioxide having the crystalline structure of rutile as is distinguished from titanium dioxide having the crystalline structure of anatase or brookite.

In our copending application Ser. No. 204,838, filed April 28, 1938, there is described a process of preparing titanium dioxide by hydrolytic decomposition of hydrolysable titanium salts which process comprises heating the hydrolysable titanium salt which process comprises heating the hydrolysable titanium salt in admixture with a sol of colloidal titanium dioxide produced by heat treating a solution of a titanium salt having univalent anions until a nucleating sol is formed.

Companion application Ser. No. 238,358, filed November 2, 1938, by P. Tillmann, F. Raspe and J. Heinen is drawn to a process of hydrolyzing a solution of a hydrolyzable titanium salt in admixture with a nucleating sol prepared by peptizing titanium hydrate obtained from a titanium salt solution with a peptizing agent having a univalent anion.

We have now found that a sol of colloidal titanium dioxide very well suited for the hydrolysis of titanium salt solutions can be prepared by mixing a titanium salt having univalent anions as such or in the form of a concentrated solution thereof, with preheated water, in such a ratio that after the mixing the resultant sol of colloidal titanium dioxide will have a concentration of titanium, calculated as $TiO_2$ of about 5 to about 20 g. per liter. The temperature of the water prior to the addition with the titanium salt or concentrated solution thereof should be such that after the mixing the resultant sol will have a temperature of about 70° C. to 100° C. When starting with titanium compounds having univalent anions as such rather than with concentrated solutions, on account of the heat of dilution produced water of correspondingly lower temperature has to be employed in order to obtain after the dilution a sol having a temperature of about 70° C. to 100° C. After the admixture of the titanium salt having univalent anion or a concentrated solution thereof with the hot water, the sol obtained should preferably be maintained at the elevated temperature for a short time in order to stabilize the sol and fully to develop its nucleating properties. Since by this method in one working step a sol of colloidal titanium dioxide is obtained which can be used immediately, this method of preparing the sol is specially suited for the continuous hydrolysis of titanium salt solutions.

Example

Titanium tetrachlorite is diluted with such a quantity of water that a titanium tetrachloride solution is obtained containing 150 g. of $TiO_2$ per liter. This titanium tetrachloride solution is added in a thin stream to water of 85° C., while constantly stirring, in such a quantity that the concentration of the nuclear solution obtained, calculated at $TiO_2$, amounts to 12 g. per liter. This hot nuclear solution, having been kept at 85° C. for about 10 to 12 minutes, is placed into the precipitation vessel, and a titanium sulfate solution of 90° C. containing about 190 g. $TiO_2$ per liter is mixed with the nuclear solution so that the ratio by weight of titanium dioxide in the titanium sulfate solution and titanium dioxide present as sol is 100 to 7.5. The mixture is heated to the boil and kept boiling for 1 hour. 94 to 96% of the $TiO_2$ present in the solution are precipitated by the hydrolysis. After washing and calcining at 840° C. for one hour a rutile pigment is obtained which possesses a tinting strength of about 1600 according to Reynolds method, as described on pages 92–93 of "Physical and Chemical Examination of Paints, Varnishes, Lacquers and Colors" by H. A. Gardner, 8th edition, published by the Institute of Paint and Varnish Research.

We claim:

1. Process for the preparation of a sol of colloidal titanium dioxide having nucleating properties with respect to hydrolyzable titanium salt solutions which comprises admixing a titanium salt having univalent anions with water in an amount sufficient to yield a concentration of titanium, calculated as $TiO_2$, between about 5 grams and about 20 grams per liter, and heating to maintain a temperature between about 70° C. and 100° C. during the admixing and thereafter for a sufficient length of time to produce a colloidal solution of titanium having a slight, stabilized opalescence and then discontinuing the heating.

2. Process for the preparation of a sol of colloidal titanium dioxide having nucleating properties with respect to hydrolyzable titanium salt solutions which comprises admixing a titanium salt having univalent anions with hot water the temperature of the water and the proportions of water and titanium salt being such that after the mixing the resultant colloidal solution of titanium will have a temperature between about 70° C. and 100° C. and a titanium concentration, calculated as $TiO_2$, between about 5 grams and 20 grams per liter, and maintaining the colloidal solution of titanium at such temperature until a slight, stabilized opalescence is produced and then discontinuing the heating.

3. Process according to claim 2 wherein the titanium salt having univalent anions is used in the form of a concentrated solution.

4. Process for the hydrolytic decomposition of a hydrolyzable titanium salt solution which comprises admixing a titanium salt having univalent anions with water in an amount sufficient to yield a concentration of titanium, calculated as $TiO_2$, between about 5 grams and 20 grams per liter, heating to maintain a temperature between about 70° C. and 100° C. during the admixing and thereafter for a sufficient length of time to produce a colloidal solution of titanium having a slight, stabilized opalescence, mixing said colloidal solution with a hydrolyzable titanium salt solution, heating the mixture hydrolytically to precipitate hydrated titanium oxide therefrom and calcining the precipitate so obtained.

5. Process for the hydrolytic decomposition of a hydrolyzable titanium salt solution which comprises admixing a titanium salt having univalent anions with hot water the temperature of the water and the proportions of water and titanium salt being such that after the mixing the resultant colloidal solution of titanium will have a temperature between about 70° C. and 100° C. and a titanium concentration, calculated $TiO_2$ between about 5 grams and 20 grams per liter, maintaining the said colloidal solution at such temperature until a slight, stabilized opalescence, mixing said colloidal solution with a hydrolyzable titanium salt solution, heating the mixture hydrolytically to precipitate hydrated titanium oxide therefrom and calcining the precipitate so obtained.

PETER TILLMANN.
FRIEDRICH RASPE.